(12) United States Patent
Sturm et al.

(10) Patent No.: US 11,336,133 B2
(45) Date of Patent: May 17, 2022

(54) STATOR FOR AN ELECTRIC MOTOR

(71) Applicant: ebm-papst Mulfingen GmbH & Co. KG, Mulfingen (DE)

(72) Inventors: Michael Sturm, Bad Mergentheim-Rot (DE); Werner Mueller, Mulfingen-Seidelklingen (DE); Thomas Ehrler, Mulfingen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 16/531,184

(22) Filed: Aug. 5, 2019

(65) Prior Publication Data

US 2019/0356181 A1    Nov. 21, 2019

Related U.S. Application Data

(63) Continuation of application No. PCT/EP2018/052019, filed on Jan. 26, 2018.

(30) Foreign Application Priority Data

Feb. 6, 2017    (DE) ..................... 10 2017 102 255.4

(51) Int. Cl.
*H02K 1/22*        (2006.01)
*H02K 16/04*       (2006.01)
(Continued)

(52) U.S. Cl.
CPC .............. *H02K 1/223* (2013.01); *H02K 16/00* (2013.01); *H02K 16/04* (2013.01); *H02K 3/34* (2013.01);
(Continued)

(58) Field of Classification Search
CPC ............ H02K 1/16; H02K 1/223; H02K 3/34; H02K 3/345; H02K 16/00; H02K 16/04; H02K 2201/06
(Continued)

(56) References Cited

U.S. PATENT DOCUMENTS

| 2003/0011272 A1* | 1/2003 | Kataoka ............... H02K 15/095 |
| | | 310/199 |
| 2003/0020357 A1* | 1/2003 | Harada .................... H02K 1/16 |
| | | 310/216.004 |

(Continued)

FOREIGN PATENT DOCUMENTS

| DE | 11 89 191 B | 3/1965 |
| DE | 102006043893 B4 | 10/2008 |

(Continued)

OTHER PUBLICATIONS

International Search Report dated Mar. 23, 2018 in corresponding PCT/EP2018/052019.

(Continued)

*Primary Examiner* — Rashad H Johnson
(74) *Attorney, Agent, or Firm* — Harness, Dickey & Pierce, P.L.C.

(57) ABSTRACT

A stator (1) for an electric motor has a modular stator body (2) with at least two stator cores (10, 20) arranged axially in series. Each core (10, 20) is form from a plurality of stacked electrical laminations (11, 21). This forms winding poles (16, 26) with radially extending winding webs (17, 27). The stator cores (10, 20) each have a separate overmolding (U1, U2).

10 Claims, 5 Drawing Sheets

(51) Int. Cl.
*H02K 16/00* (2006.01)
*H02K 3/34* (2006.01)

(52) U.S. Cl.
CPC ......... *H02K 3/345* (2013.01); *H02K 2201/06* (2013.01)

(58) Field of Classification Search
USPC ..... 310/24, 181, 216.024, 216.025, 216.027, 310/216.029, 216.031, 216.032, 216.034
See application file for complete search history.

(56) References Cited

U.S. PATENT DOCUMENTS

| | | | | |
|---|---|---|---|---|
| 2004/0061408 A1* | 4/2004 | Grant | ................... | H02K 3/345 |
| | | | | 310/216.016 |
| 2004/0061409 A1* | 4/2004 | Grant | ................... | H02K 15/024 |
| | | | | 310/216.057 |
| 2005/0140241 A1 | 6/2005 | Petersen | | |
| 2009/0324435 A1* | 12/2009 | Sears | ..................... | H02K 3/522 |
| | | | | 417/423.7 |
| 2010/0231084 A1* | 9/2010 | Kinoshita | .............. | H02K 1/148 |
| | | | | 310/216.009 |
| 2013/0221771 A1* | 8/2013 | Kono | .................. | H02K 21/046 |
| | | | | 310/44 |
| 2014/0015356 A1* | 1/2014 | Chamberlin | ............. | H02K 9/19 |
| | | | | 310/64 |
| 2014/0265694 A1* | 9/2014 | Matsuoka | .............. | H02K 16/00 |
| | | | | 310/112 |
| 2015/0048708 A1* | 2/2015 | Nord | ...................... | H02K 1/145 |
| | | | | 310/156.56 |
| 2015/0069878 A1* | 3/2015 | Hattori | ................... | H02K 1/146 |
| | | | | 310/215 |
| 2017/0222511 A1* | 8/2017 | Wang | ..................... | H02K 3/522 |
| 2020/0177044 A1* | 6/2020 | Duricic | .................... | H02K 3/52 |

FOREIGN PATENT DOCUMENTS

| | | |
|---|---|---|
| DE | 102014221204 A1 | 4/2016 |
| EP | 2 015 426 B1 | 8/2011 |
| EP | 2882077 A1 | 6/2015 |
| JP | H06 14506 A | 1/1994 |
| WO | WO-2012-038361 A1 | 3/2012 |

OTHER PUBLICATIONS

European Office Action dated Dec. 7, 2020 in corresponding European Application No. 18702246.2.

* cited by examiner

STATOR FOR AN ELECTRIC MOTOR

CROSS-REFERENCE TO RELATED APPLICATIONS

This application is a continuation of International Application No. PCT/EP2018/052019, filed Jan. 26, 2018, which claims priority to German Application No. 10 2017 102 255.4, filed Feb. 6, 2017. The disclosures of the above applications are incorporating herein by reference.

FIELD

The disclosure relates to a stator for an electrodynamic machine, in particular an electric motor.

BACKGROUND

A stator for an electric motor typically consists, inter aha, of a stator core. The stator core, intended for this purpose, is composed of individual electrical laminations. The stator core is additionally equipped with a number of stator poles (or webs). They extend radially into the interior of the stator core. Alternatively, in the case of externally slotted stator cores, they extend radially outward. Between the individual stator poles, intermediate spaces in the form of pole slots or winding slots are located. The stator poles serve to accommodate stator coils.

In a stator for an electric motor, it is known for winding to be implemented around teeth of a laminated core. The laminated core is produced by welding, for example. For electrical insulation, insulation is inserted between the winding region and laminated core.

Typically, the inner surface of the stator core, the stator poles (webs), and the pole slots are overmolded or encapsulated with plastic. Alternatively, the pole slots ay be insulated with insulating paper. The plastic may be a polymer, e.g. thermosetting or thermoplastic material, for example. The plastic overmolding typically forms the winding supports around the individual stator poles, that serve to accommodate the stator coils.

EP 2015426 B illustrates a stator for a drive device. The stator in this case has two axial stator ends. A connection element, such as an end shield or a cover, is arranged on each end. The stator further has a plurality of webs in its interior. The webs extend over the entire length of the stator and are divided by winding slots. A stator winding or stator coil is applied around the webs. Slot insulation is provided between the webs and the stator winding.

Stator cores are insulated in this way by being overmolded with viscous plastic material, for example. A very critical problem with such processes involves the production of thin insulation walls. Thick insulation results as a disadvantage of a lower degree of copper fill.

Overmolding of the stator core is also known with stators having skewed slots. However, overmolding is always performed for the entire unified stator core, by a single overmolding as it were. With plastic overmolding, achieving thin wall thicknesses in the stator slots is a major concern. The problem here is that stator cores with greater overall lengths, e.g. lengths greater than 100 mm, necessitate the plastic overmolding material traveling long flow paths in the overmolding tool during the injection cycle in the region of the slots. This necessitates corresponding flow cross sections, that result in thicker insulating wall thicknesses.

Disadvantages of this include the already mentioned reduced copper fill as well as a decrease in magnetic efficiency of the motor.

SUMMARY

It is an object of the present disclosure to overcome the aforementioned disadvantages. The disclosure provides a stator that has a sufficiently thin insulation wall wherever possible, in particular for long overall axial lengths.

This object is attained by the combination of a stator for an electric motor with a modular stator body with at least two stator cores arranged axially in series. Each core is formed from a plurality of stacked electrical laminations. This forms winding poles with radially extending winding webs. The stator cores each have a separate overmolding.

A fundamental concept of the present disclosure involves assembling a stator body from a plurality of individually overmolded "short" stator cores in modular fashion. This produces a stator body with the required overall length. After being overmolded separately, the individual modular stator cores are assembled axially in series at their end faces by means of connecting means that are preferably integrated in the stator cores. This enables substantially thinner overmolding layers to be produced. Thus, thinner layer thicknesses and/or thinner insulating walls can be achieved in an assembled stator body as compared with a single stator body.

The disclosure proposes a stator for an electric motor with a modular stator body. It includes at least two stator cores arranged axially in series. Each core is formed from a multiplicity of stacked electrical laminations. This forms winding poles with radially extending winding webs. The respective stator cores each have a separate overmolding.

In a preferred embodiment of the disclosure, the respective overmolding is applied to the inner surface of the respective stator core in the winding region, on the winding webs and on the pole slots between the winding poles.

Further advantageous exists where corresponding connectors are provided on the two end-face electrical laminations of mutually adjacent stator cores. This produces the mechanical connection between the stator cores in question. For an assembly composed of two stator cores, this means that the connectors are arranged at the end-face abutting surfaces of the stator cores.

It is likewise advantageous for the connectors on one stator core to be configured as a protruding catch, that extend into an opposing catch, in the form of corresponding openings, appropriately formed on the second stator core, producing a clamping connection.

It is further preferable for plastic lands to protrude peripherally along the winding poles from the end face of one stator core. Also, they extend into the respective corresponding intermediate spaces of the winding poles of the adjacent stator core. For this purpose, e.g. the overmolding can be recessed or set back in the appropriately corresponding region on the other stator core.

For this purpose, it is particularly advantageous for several immediately adjacent electrical laminations of the adjacent stator core, arranged at the end thereof, to be without overmolding on the surfaces that correspond to the plastic lands. Therefore, preferably the stator core is without overmolding on the inner surface in the winding region, on the winding webs and on the pole slots between the winding poles.

In a preferred embodiment of the disclosure, two or all of the stator cores arranged axially in series have the same or approximately the same overall axial length. It is even more preferable for all of the stator cores to be identical in structure. Thus, their production can be especially cost-optimized. Depending upon the desired embodiment, end plates or connecting rings can be mounted on the stator cores.

The disclosure can be applied to stator cores with straight slots and to stator cores with skewed slots. Advantageously, the slot ends of the slots of one stator core are aligned with the slot beginnings of the corresponding slots of the adjoining stator core. Thus, continuous pole slots are produced along the stator body in each case. The same applies to skewed pole slots, where the paths of the slots of one stator core merge into those of the other stator core, taking into account the selected helix angle.

In a further advantageous embodiment, the respective end faces of the end laminations of the two stator cores are likewise overmolded. Preferably, they have a thickness of approximately 0.3 mm to approximately 0.6 mm.

A further aspect of the present disclosure relates to a method of producing a stator as described above.

A first stator core is formed from a multiplicity of stacked electrical laminations. The stator core is overmolded. At least one additional stator core is formed from a multiplicity of stacked electrical laminations. The additional stator core is overmolded. The stator cores are aligned with one another axially. The first and at least the second stator core are connected mechanically by end-face connecting elements to form a stator body.

Advantageously, the connection step is accomplished without tools, simply via a mating process or joining process. The primary force holding the stator cores together is produced at a later time by the wire windings.

Other advantageous refinements of the disclosure are characterized in the dependent claims and will be described in greater detail in the following in conjunction with the description of the preferred embodiment of the disclosure, with reference to the figures.

DRAWINGS

The drawings described herein are for illustrative purposes only of selected embodiments and not all possible implementations, and are not intended to limit the scope of the present disclosure.

DETAILED DESCRIPTION

In the following, the disclosure will be described in greater detail based upon the example of externally slotted stators, making reference to FIGS. 1 to 5, where like reference signs denote the same structural and/or functional features.

Figure 1:
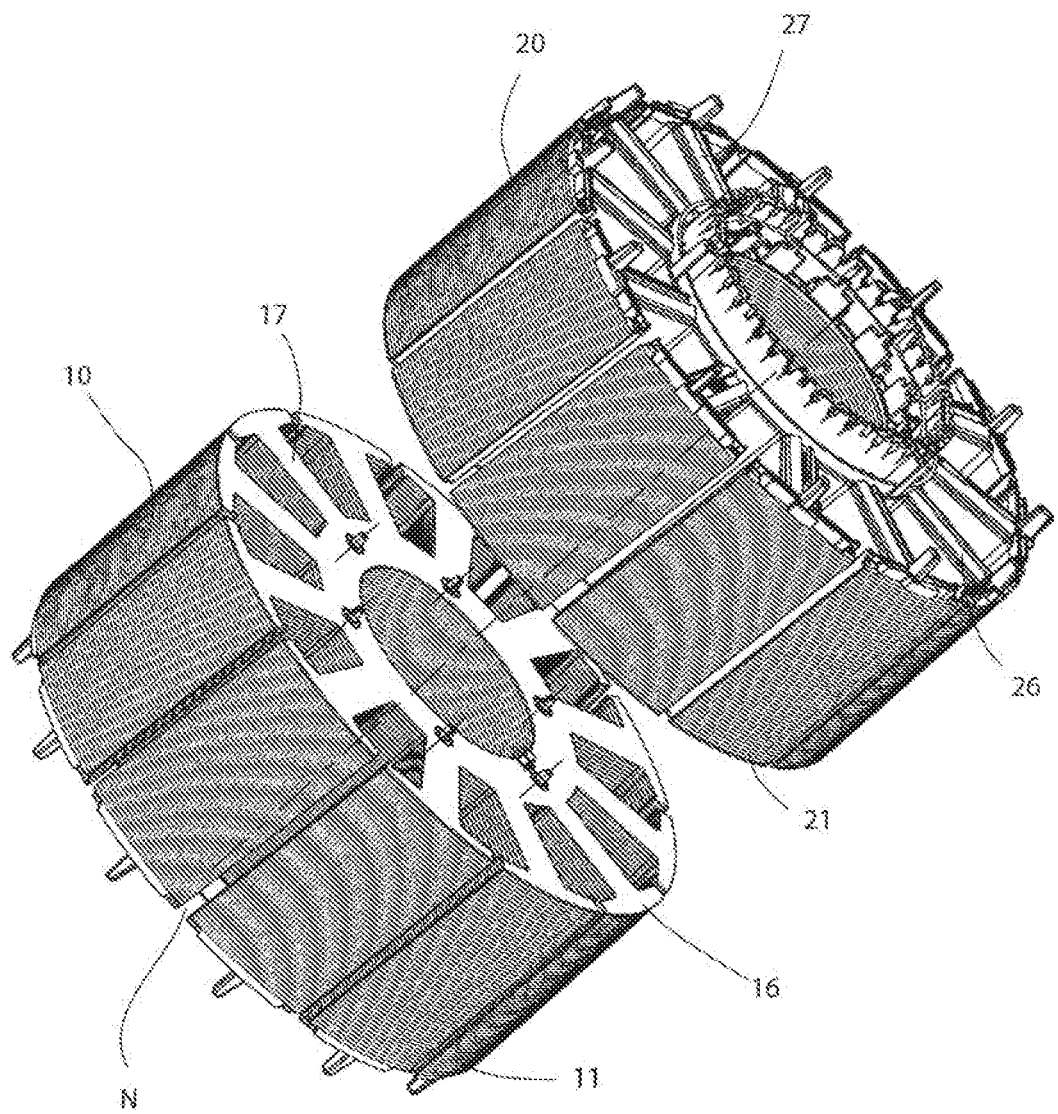
FIG. 1 is a perspective view of two stator cores, to produce a stator body, in a preassembled state.
Figure 2:
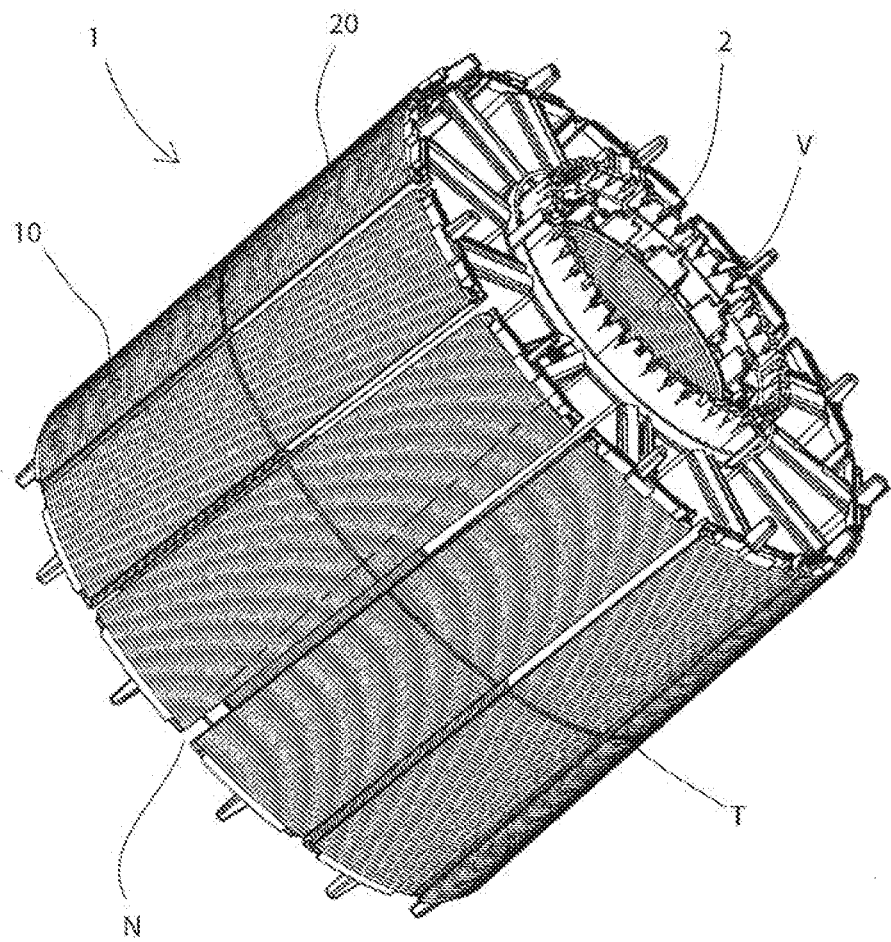
FIG. 2 is a perspective view of a stator body composed of two stator cores.
Figure 3:
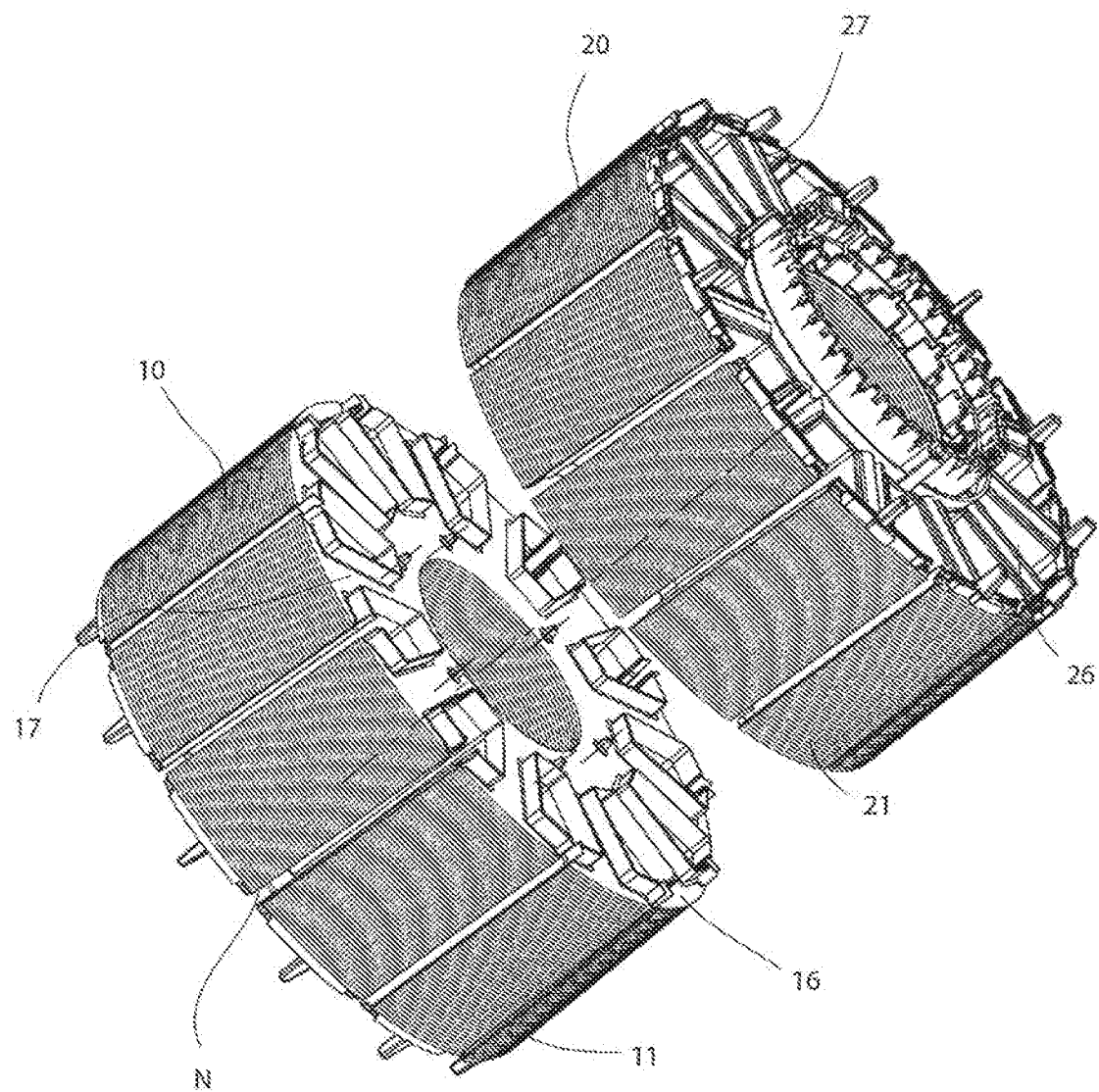
FIG. 3 is a perspective view of an alternative embodiment of two stator cores, to produce a stator body, in a preassembled state.

FIGS. 1 and 3 each show a perspective view of two stator cores 10, 20, to produce a stator body 2, in a preassembled state. FIG. 2 shows a perspective view of the stator body 2 composed of the two stator cores 10, 20.

The stator body 2, together with the end caps and connecting ring V, form an as yet unwound stator 1 for an electric motor. The stator 1 includes, in these embodiments, two stator cores 10, 20 arranged axially in series and resting against one another as shown in FIG. 2. Each of the stator cores 10, 20 is formed from a multiplicity of stacked electrical laminations 11, 21. In this example, the laminations 11, 21 each form winding poles 16, 26, with winding webs 17, 27 extending radially outward. The stator cores 10, 20 each include a separate overmolding U1, U2.

Figure 4:
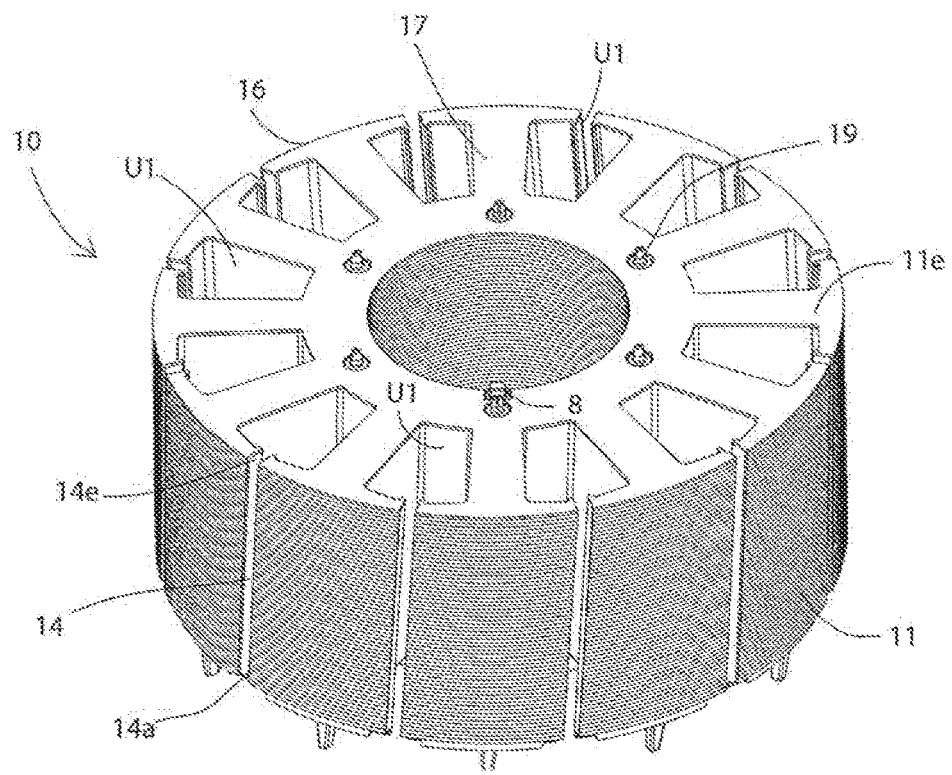
FIG. 4 is a perspective view of the two end laminations of the stator cores of FIG. 1.
Figure 4:
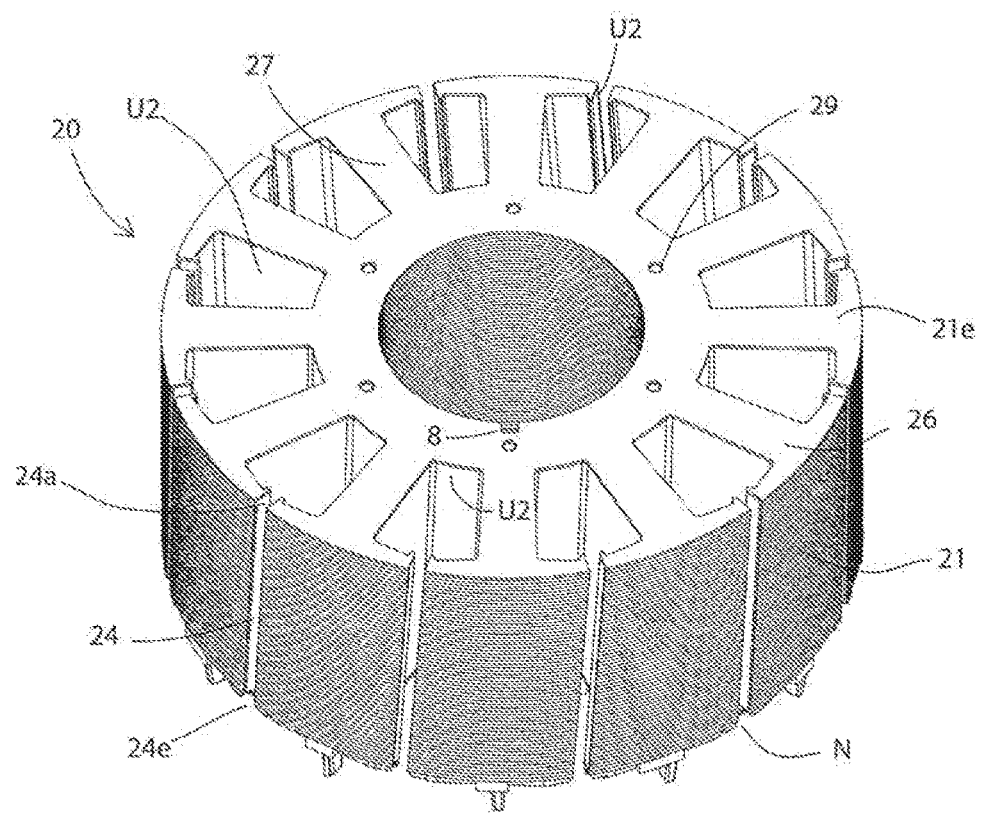
Figure 5:
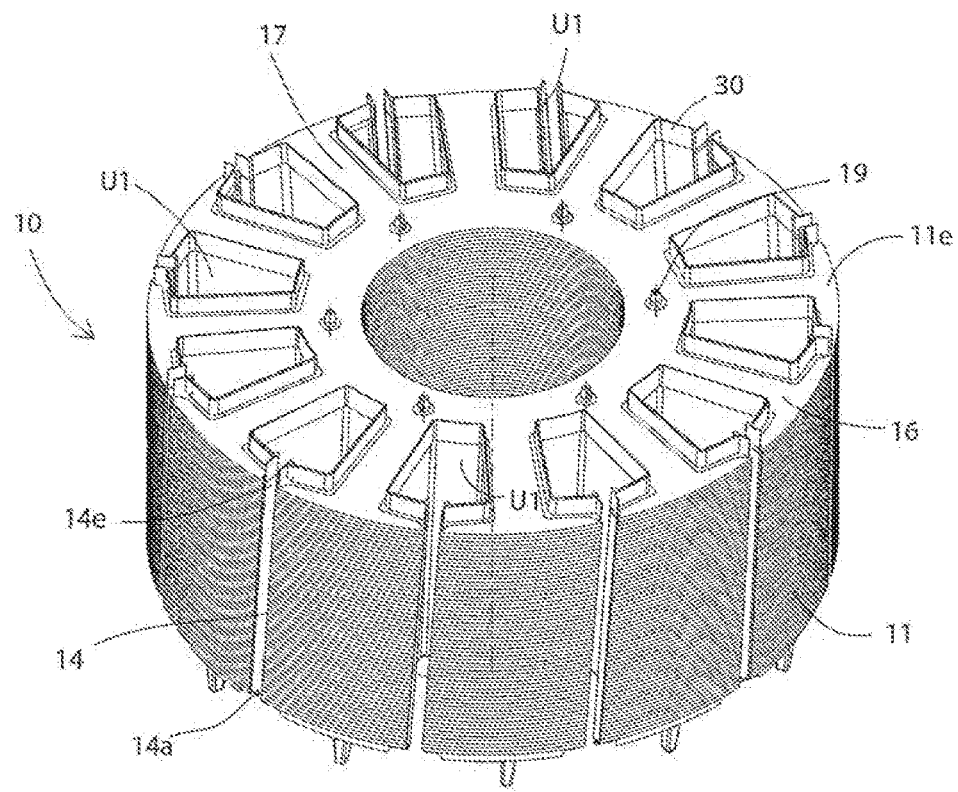
FIG. 5 is a perspective view of the two end laminations of the stator cores of FIG. 3.
Figure 5:
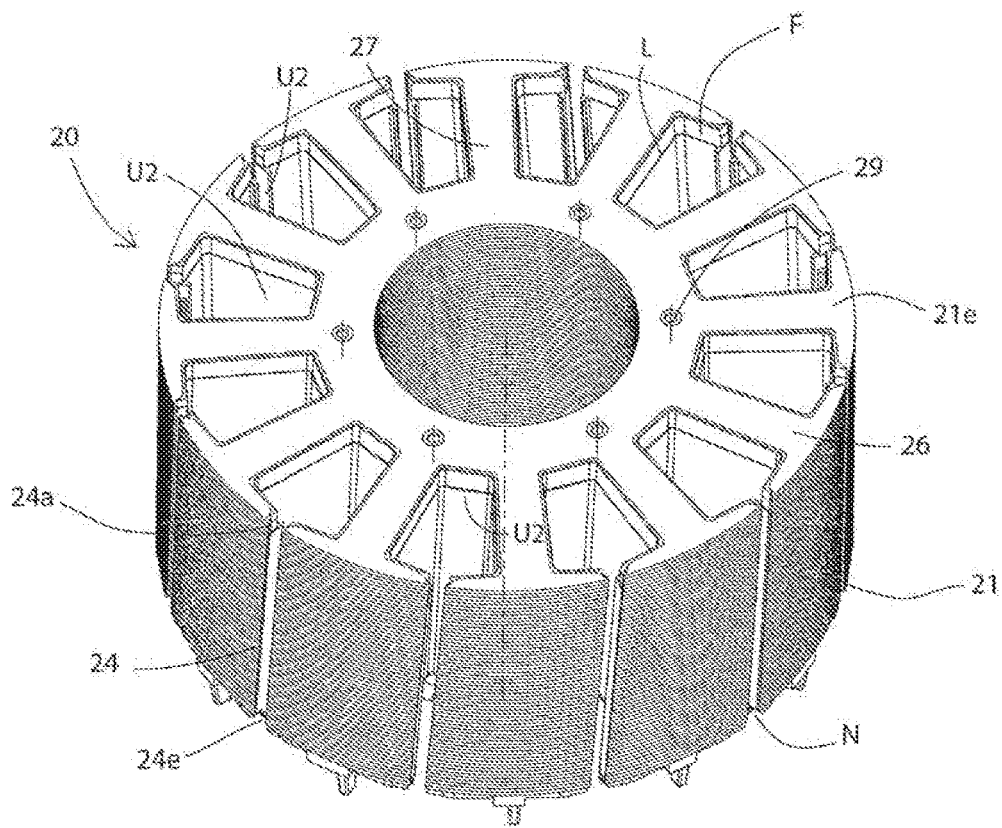

As is clear from FIGS. 4 and 5, the respective overmolding U1, U2 is applied to the respective inner surface of the respective stator core 10, 20 in the winding region. It extends to the winding webs 17, 27 and to the end faces between the pole slots N between the winding poles 16, 26. FIG. 4 further shows a perspective view of the two end laminations (11e, 21e) of the stator cores 10, 20 from the exemplary embodiment of FIG. 1. FIG. 5 shows a perspective view of the two end laminations (11e, 21e) of stator cores 10, 20 from the exemplary embodiment of FIG. 3.

The two electrical laminations 11e, 21e are located on the end faces of two stator cores 10, 20 to produce a stator 1. Corresponding connectors 19, 29 are provided to effect the mechanical connection between the stator cores 10, 20 in question.

The stator cores 10, 20 are aligned axially with one another. The first and second stator cores 10, 20 are connected to one another mechanically by means of the illustrated end-face connecting elements. The configuration of the connectors 19, 29 enables this connection to be accomplished without tools. The assembly is effected exclusively via a mating connection process. The connectors 19 are configured as a protruding catch. The catch extends into the opposing catch 29, in the form of corresponding openings formed on the second stator core 20, producing a clamping connection. Advantageously, an index member 8, in the form of a recess, may be provided in the electrical laminations.

In the exemplary embodiment of FIGS. 3 and 5, plastic lands 30 protrude peripherally along the winding poles 16 from the end face of one stator core 10, around the intermediate spaces of the winding poles and into the slot N. When the two stator cores 10, 20 are in the assembled state, these plastic lands 30 of the stator core 10 extend into the respective corresponding intermediate spaces of the winding poles 26 of the other stator core 20. For this purpose, several immediately adjacent electrical laminations 21, 21e of the second stator core 20, located at the end thereof, are embodied to have no overmolding U2 on the inner surface F in the winding region, winding webs 17, 27, and have no overmolding U2 on the pole slots 24 between the winding poles 26. The resulting shoulder is illustrated schematically by a circumferential line L in FIG. 5.

The inner surfaces must be set back and overmolded accordingly in the indicated region of the inner surface F of the lamination. This achieves the required air gap and creepage distances. In an alternative embodiment, a configuration without this overmolding would be possible, although this would result n shorter air gap and creepage distances.

The primary force holding the stator cores together is produced at a later time by the wire windings.

To prevent the electrical laminations that are stacked loosely in the stator cores, from fanning out at the end faces (connecting points), the laminations are held together axially in an interlocking manner by end laminations (approximately 4 end laminations measuring approximately 2 mm). They are inserted in a set-back position in the slot region (along the winding paths), and by the resulting formation of a shoulder and the overmolding.

The end laminations (e.g., the 4 mentioned end laminations), that have no axial interlocking of the overmolding, can be glued to the last overmolded electrical lamination during the overmolding process. Thus, they can be prevented from fanning out axially.

As is further clear from FIG. 2, the slots N of the assembled stator cores 10, 20 are aligned. This is ensured by the fact that the slot ends 14e of the slots 14 of one stator core 10, as shown in FIGS. 4 and 5, are aligned with the slot beginnings 24a of the corresponding slots 24 of the adjoining stator core 20. Thus, continuous skewed pole slots N extending along the stator body 2 are produced in each case.

In the exemplary embodiment shown in FIGS. 1 and 4, the respective end faces of the end laminations 11e, 21e of the two stator cores 10, 20 are likewise overmolded. Specifically, in a thickness of approximately 0.3 mm.

The embodiment of the disclosure is not restricted to the preferred embodiment examples described above. For instance, the disclosure may also be implemented in embodiments having straight slots and in internally slotted stator bodies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A stator for an electric motor comprising:
   a modular stator body including at least two stator cores arranged axially in series in electrical contact, each stator core is formed from a plurality of stacked electrical laminations that form winding poles with radially extending winding webs;
   the stator cores each have a separate overmolding, the respective overmolding is applied to the inner surface of the respective stator core in a winding region, to the winding webs and to pole slots (N) between the winding poles and several immediately adjacent electrical laminations of the adjacent stator core, arranged at its end, have no overmolding on the inner surface in the winding region to the winding web and to the pole slots between the winding poles.

2. The stator according to claim 1, wherein connectors are provided on the two end-face electrical laminations of mutually adjacent stator cores, the connectors mechanically connect between the stator cores.

3. The stator according to claim 2, wherein on one stator core, the connectors are configured as a protruding catch that extend into opposing catches that are in the form of corresponding openings suitably formed on the second stator core to produce a clamping connection.

4. The stator according to claim 1, wherein plastic lands protrude peripherally along the winding poles from the end face of one stator core, the plastic lands extend into the respective corresponding intermediate spaces of the winding poles of the adjacent stator core.

5. The stator according to claim 1, wherein two or all of the stator cores arranged axially in series have the same or approximately the same overall axial length.

6. The stator according to claim 1, wherein the slots of the stator cores are skewed or straight.

7. The stator according to claim 6, wherein in case of the skewed slots the slots ends of the slots of one stator core are aligned with the slot beginnings of the corresponding slots of the adjoining stator core, so that the continuous, skewed pole slots extend along the stator body.

8. The stator according to claim 1, wherein the respective end faces of the end laminations of the two stator cores are likewise overmolded, preferably in a thickness of approximately 0.3 mm to approximately 0.6 mm.

9. A method for producing a stator comprising the steps of:
   providing a first stator core formed from a plurality of stacked electrical laminations;
   overmolding plastic onto the first stator core;
   providing at least one additional stator core formed from a plurality of stacked electric laminations;
   overmolding plastic onto the at least one additional stator core;
   omitting overmolding on several immediately adjacent electrical laminations of the adjacent stator core, arranged at its end, to have no overmolding on the inner surface in the winding region to the winding web and to the pole slots between the winding poles;
   aligning the stator cores axially with one another;
   connecting the first and at least the second stator core electrically and mechanically at end-face connectors; and
   forming a stator body.

10. The method according to claim 9, wherein the connecting step is accomplished without tools, via a mating process or joining process.

* * * * *